US011619547B2

(12) United States Patent
Gauvain et al.

(10) Patent No.: US 11,619,547 B2
(45) Date of Patent: Apr. 4, 2023

(54) REMOTE SPECTROMETER CONTROL SYSTEM

(71) Applicant: GREENTROPISM, Paris (FR)

(72) Inventors: Pierre Gauvain, Adainville (FR); Anthony Boulanger, Paris (FR)

(73) Assignee: GREENTROPISM, Paris (FR)

( * ) Notice: Subject to any disclaimer, the term of this patent is extended or adjusted under 35 U.S.C. 154(b) by 0 days.

(21) Appl. No.: 17/277,905

(22) PCT Filed: Sep. 25, 2019

(86) PCT No.: PCT/EP2019/075787
§ 371 (c)(1),
(2) Date: Mar. 19, 2021

(87) PCT Pub. No.: WO2020/064790
PCT Pub. Date: Apr. 2, 2020

(65) Prior Publication Data
US 2021/0348968 A1     Nov. 11, 2021

(30) Foreign Application Priority Data

Sep. 25, 2018    (FR) ........................................ 1858739

(51) Int. Cl.
*G01J 3/02*          (2006.01)
*G01J 3/42*          (2006.01)
(Continued)

(52) U.S. Cl.
CPC ........... *G01J 3/0264* (2013.01); *G01J 3/0291* (2013.01); *G01J 3/42* (2013.01); *G01J 2003/2836* (2013.01); *H01J 49/025* (2013.01)

(58) Field of Classification Search
CPC ............. G01J 2003/2836; G01J 3/0264; G01J 3/0291; G01J 3/42; G01N 21/31;
(Continued)

(56) References Cited

U.S. PATENT DOCUMENTS 6,012,019 A * 1/2000 Saby .................... G01N 21/359
                                                           702/30
8,699,020 B1 * 4/2014 Zhou ...................... G01N 21/65
                                                           356/301

(Continued)

FOREIGN PATENT DOCUMENTS

JP         2005094185 A     4/2005
WO      2018/073730 A2     4/2018

OTHER PUBLICATIONS

International Search Report (with English translation) and Written Opinion (with machine translation) dated Oct. 25, 2019 in corresponding International Application No. PCT/EP2019/075787; 13 pages.

*Primary Examiner* — Hina F Ayub
(74) *Attorney, Agent, or Firm* — Maier & Maier, PLLC

(57) ABSTRACT

A system for remote-controlling a spectrometer, which includes: at least one spectrometry device including a spectrometer and auxiliary modules, the spectrometry device being configured to measure spectrometry data on an object and/or a process; a control device configured to control the spectrometry device, the control device including an element for controlling the spectrometry device, an element for acquiring and processing the spectrometry data, and an element for remote communication; and at least one interface modules configured to communicate with the control device remotely. The remote-control device is configured to communicate with the interface module via Internet, and the spectrometry device is interchangeable. Also, a device for remote-controlling a spectrometry system that is configured to be used in a system for remote-controlling the spectrometer.

8 Claims, 2 Drawing Sheets

(51) Int. Cl.
  *G01J 3/28* (2006.01)
  *H01J 49/02* (2006.01)
(58) Field of Classification Search
  CPC ..... G08C 17/00; G08C 2201/42; H01J 49/00; H01J 49/025
  See application file for complete search history.

(56) References Cited

U.S. PATENT DOCUMENTS

| | | |
|---|---|---|
| 9,406,492 B1 | 8/2016 | Ramsey et al. |
| 10,983,045 B2 * | 4/2021 | Darby ................... G01J 3/42 |
| 2005/0229698 A1 * | 10/2005 | Beecroft ............... G01J 3/0264 |
| | | 73/300 |
| 2019/0285471 A1 * | 9/2019 | Milo .................... G01J 3/0218 |

* cited by examiner

REMOTE SPECTROMETER CONTROL SYSTEM

FIELD

The present invention relates to a remote spectrometer control system. It also relates to a device for controlling a spectrometer of such a system.

The field of the invention is, without limitation, the field of remote analyses.

BACKGROUND

Spectrometry is an essential tool for identification, quantification and characterization of substances, compounds or molecules. It is used in many scientific fields, such as physics, organic chemistry, assays or medicine. Spectrometry is also very important in the industrial field, for example for quality control in production, control of mixtures, in-line cleaning or monitoring anaerobic digestion centers.

One of its major advantages is the very fast detection time.

However, in some cases, it is not possible or it is very difficult for an operator to drive or handle a spectrometer directly on site. Indeed, spectrometers can be used in environments that are dangerous for humans or restrictive in terms of access restrictions such as clean rooms. It may also be necessary to carry out permanent and continuous measurements or checks in the absence of any operator, the latter being able to carry out only occasional measurements during his presence.

To use a spectrometer under such conditions, it is necessary to have a remote-control system for the spectrometer.

SUMMARY

A goal of the present invention is to improve current remote-control systems.

A goal of the present invention is to provide a spectrometer remote control system which represents a global solution for performing spectrometric analyses in environments that are inaccessible to an operator whatever the operator's distance from the place of the analyses.

Another goal of the present invention is to provide a spectrometer remote control system in which any type of spectrometer can be used in order to allow performing any type of spectrometric analysis.

It is yet another goal of the present invention to provide a device for remotely controlling a spectrometric device, the control device being able to be implemented in the remote spectrometer control system.

At least one of these goals is achieved with a spectrometer remote control system, comprising:
- at least one spectrometric device comprising a spectrometer and auxiliary modules, the spectrometric device being configured to measure spectrometric data relating to an object and/or a process;
- a control device configured to control the spectrometric device, comprising:
  - means of controlling the spectrometric device,
  - means of acquiring and processing spectrometric data,
  - means of remote-communicating; and
- at least one interface module configured to communicate with the remote-control device, wherein:
the remote-control device is configured to communicate with the interface module via the Internet, and the spectrometric device is interchangeable.

The system according to the present invention provides to one or more operators with means to access and control one or more spectrometric devices with an interface module or a personal device such as a smartphone or a laptop via an internet connection. Only a web browser is required on the personal device, and therefore the operator can log in from anywhere. The system allows access to the spectrometer system, management of its auxiliary modules such as light sources, valves or relays, necessary for proper operation of the spectrometer, control of the spectrometer as well as configuration and maintenance of the spectrometer system. No specific application is necessary on the interface module, the entire application being installed on the control device.

Also, the system according to the invention is operatable with any type of spectrometric device, the control device allowing the remote-control of any type of spectrometer and its auxiliary modules (for example using different spectrometric technologies or from different manufacturers), and especially those not equipped with a remote-control resource.

Hereinafter, it is well understood that the system according to the present invention may comprise one or more spectrometric devices as well as one or more interface modules even if only one of these elements is mentioned or described.

The term "an object and/or a process" means any object, material, fluid, manufacturing process, transformation process, etc. on which spectrometric measurements can be made with the present system.

Advantageously, the interface module may be interchangeable.

Thus, the system according to the invention is operatable with any type of interface module.

For example, the interface module may comprise at least one of:
- a smartphone,
- a smartwatch,
- a digital tablet,
- a laptop,
- a desktop computer.

According to a particularly advantageous embodiment, the remote-control device may also be configured to communicate with the interface module via a wired or wireless local network.

Thus, the operator can connect with his interface module near the control device, for example from a room adjoining the room of the spectrometric device, via an Ethernet or WLAN (or WiFi) connection. An operator can thus connect via the local network, and another operator at a greater distance via Internet.

According to one embodiment of the invention, the means for controlling the spectrometric device may comprise at least:
- means for configuring the spectrometric device;
- means for controlling the spectrometer; and/or
- means for controlling auxiliary modules.

Advantageously, the means for acquiring and processing spectrometric data of the control device include a database comprising models of reference spectra and a prediction library.

According to one embodiment, the control device may further comprise alert means configured to deliver alert signals to the interface module when the monitoring device has detected anomalies in the operation of the spectrometric device, the object and/or the process measured by the spectrometric device.

According to another embodiment, the spectrometer may be a miniature spectrometer.

According to another embodiment, the invention relates to a control device for remotely controlling a spectrometric device, the device comprising:
  means for controlling the spectrometric device,
  means for acquiring and processing spectrometric data, and
  means for remote-communicating,
the control device being configured to be used in a spectrometer remote control system according to the invention.

BRIEF DESCRIPTION OF THE DRAWINGS

Other advantages and characteristics will appear upon examination of the detailed description of non-limiting examples, and of the appended drawings in which: device comprising.

DETAILED DESCRIPTION

It is understood that the embodiments which will be described below are in no way limiting. It is in particular possible to imagine variants of the invention comprising only a selection of features described below, isolated from the other disclosed features, if this selection of features is sufficient to provide a technical advantage or to differentiate the invention from the prior art. This selection comprises at least one feature, preferably functional, without structural details, or with only part of the structural details if this part alone is sufficient to provide a technical advantage or to differentiate the invention from the prior art.

In particular, all the described variants and embodiments can be combined with one another if nothing prevents this combination from a technical point of view.

In the figures, the common elements to several figures have the same reference.

Figure 1:
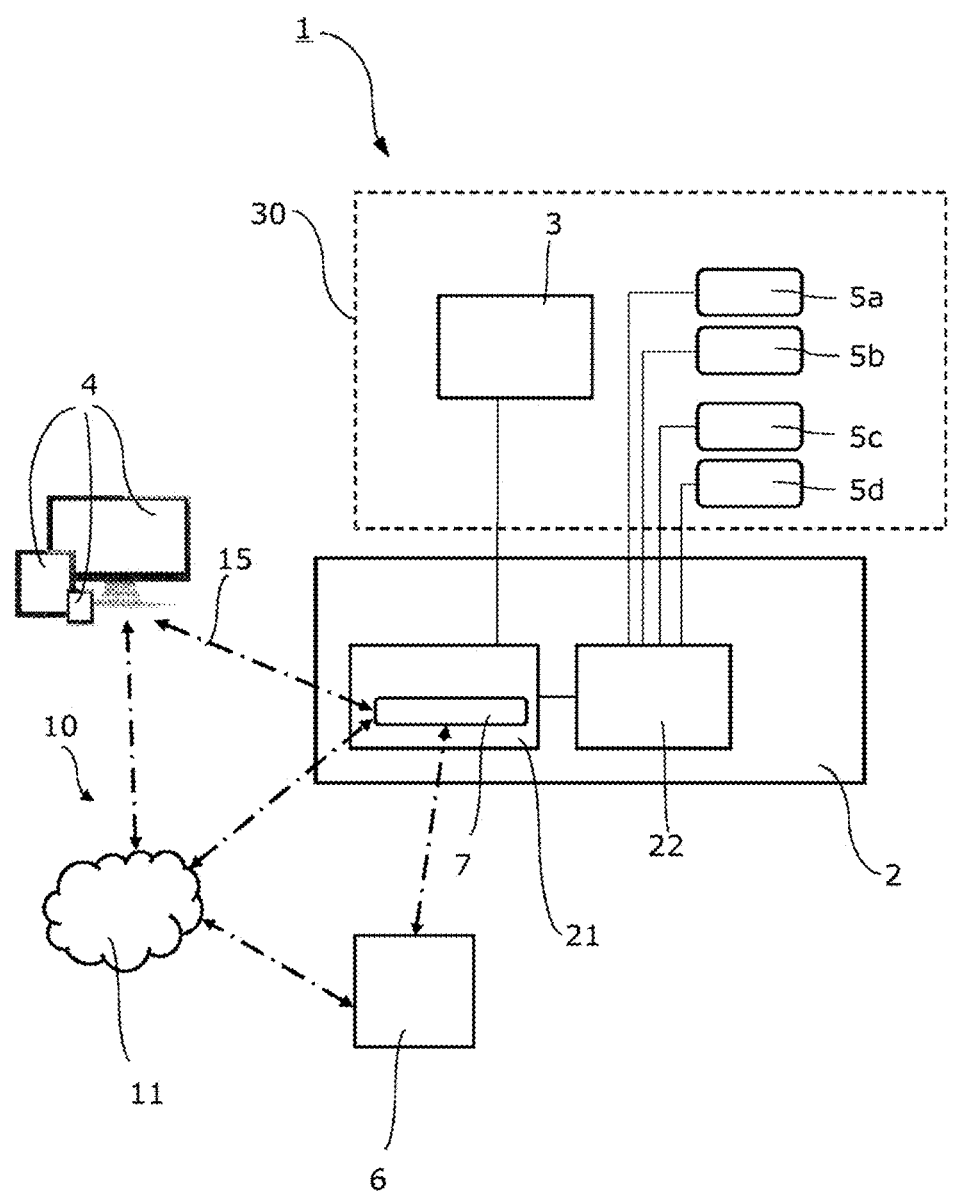
FIG. 1 is a schematic representation of a remote spectrometer control system according to one embodiment of the invention.

FIG. 1 schematically shows an example of a spectrometer remote control system according to one embodiment of the invention. The system 1 comprises a control device 2, at least one spectrometric device 30 and at least one interface device/module 4. The spectrometric device 30 comprises a spectrometer 3 and a plurality of auxiliary modules or devices 5a, 5b, 5c, 5d.

The spectrometer 3 is configured to measure mass spectra, absorption spectra, reflection spectra, transflexion spectra and/or transmission spectra of substances or compounds which are found, in particular, in environment to which it is not possible or very difficult for an operator to access and, by extension, to any type of spectral data presentation, including multi- or hyperspectral imaging data. These environments can be, for example, toxic environments such as anaerobic digestion centers, environments with chemical or explosive hazards or presenting other hazards, environments that are difficult to access for a human or robotized operator, or accessible only by drones, environments requiring permanent control, or very sensitive environments such as clean rooms.

The control device 2 and the spectrometric device 30 are located in the same local network. For instance, the spectrometric device 30 can be provided in a laboratory, a factory room, a chemical processing room, etc., and the control device 2 can be provided in a nearby room, for example in the same building as the spectrometric device 30.

The control device 2 comprises a main controller board 21 and at least one auxiliary controller board 22 for the auxiliary modules 5a-5d. The main controller board 21 is configured to control the spectrometer and to connect the control device 2 to the interface module 4. The at least one auxiliary controller board 22 is connected to the main controller board 21 and is configured to control the auxiliary devices 5a-5d.

The control device 2 may also include a locked or an evolving database. This database includes a library for predicting data and reference models. The control device 2 can then be configured to analyze the measured spectrometric data and perform algorithmic processing, allowing a comparison of the structure of these input spectral data with reference data. The analyzed data which evolve according to reference models allow to output a result of a quantification and/or classification analysis.

The spectrometer 3, the auxiliary modules 5a-5d and the control device 2 are connected by local communication means such as computer buses ("Universal Serial Bus", USB; "General Purpose Interface Bus", GBIP) or Ethernet. The auxiliary devices or modules 5a-5d are provided in the same local network and are also connected to the control device 2 by the aforementioned local communication means.

In a particularly advantageous manner, the interface module 4 is connected to the control device 2 via an internet connection. This connection is a secured connection in order to protect the data exchanged between the control device 2 and the interface module 4. A secured connection can be implemented, for example, by a virtual private network (VPN) created via computer tunnels. With reference to FIG. 1, the internet connection 10 can pass through a cloud 11 to allow, for example, the control device 2 to initiate a "relay" connection point. This allows to avoid opening of the local connection ports to the network infrastructure within which the control device 2 and the spectrometric device 30 are located.

The interface module 4 is an input and output device for an operator using the spectrometric device 30 remotely. The interface module 4 is provided at a distance from the spectrometer 3 and from the control device 2. The distance between the interface module 4 and the spectrometric device 30 can vary considerably. An operator can access the control device 2 from any location. The distance can be, for example, a few meters when the operator is, with his interface module 4, in the room next to the room where the spectrometer is installed. The distance can also be several thousand kilometers.

For the implementation of the connection of the control device 2 with the interface module 4, one or more routers 6 can be used. The control device 2 may communicate with such a router 6 via Ethernet or via a wireless connection (WLAN). The control device 2 is also equipped with an access point 7 to a local network and/or the Internet.

The auxiliary modules 5a-5d may comprise, for example, a light source for the spectrometer 3, electrical relays, dry contact switches, valves, etc.

The control device 2 is equipped with a specific application allowing to control, manage and configure the spectrometer 3 as well as all the auxiliary modules 5a-5d. The embedded application is specific to the spectrometric device 30 with which the control device 2 is used. The control device 2 allows in particular to carry out, remotely or not, the following actions (non-exhaustive list):

the configuration of spectrometer 3, the start of a spectrum measurement session, the acquisition of raw spectrometric data, the processing of spectrometric data and calculation of spectra from prediction and reference models using the database embedded in control device 2, and the management of the maintenance of the resources that are embedded in the control device 2 such as software bricks and the database, that is to say, for example, their regular and/or occasional updating.

The control device 2 also allows to remotely perform:

the configuration of auxiliary modules 5a-5d in order to adapt the spectrometric device 30 to current measurement constraints, the control of the auxiliary modules 5a-5d, for example of solenoid valves and/or relays, or switching on of various equipment, the management of the maintenance of auxiliary modules 5a-5d.

By way of example, it is possible to control the switching on and off of the light source of the spectrometer. This is particularly important when the light source is associated with an optical fiber. Indeed, an optical fiber allows to deport the measurement point to few meters from the spectrometer, for example for reasons of size or ease of installation. The light source is then switched on only when light needs to be sent to the material or object to be analyzed, thus allowing increasing of the lifetime of the light source.

Advantageously, it is in particular possible to carry out a continuous and automatic cyclic spectrometric analysis, while having the possibility of taking control over the spectrometric device 30 remotely if necessary.

When an analysis result does not correspond to the expected results, if the spectrometer 3 or one of the auxiliary modules 5a-5d shows anomalies, a failure or signs of a nearby failure, the control device 2 delivers to the interface module 4 an alert signal. This alert signal can, for example, be sent by email or SMS to the one or more operators. In this case, the operator is warned that the results of the analysis obtained may be erroneous. An operator can also intervene in time on site or remotely to restore the spectrometric device 30 to perfect working state, if necessary.

The interface module 4 can be of any type of operator terminal, provided that it has an Internet connection functionality and a web browser. The interface module 4 can be, for example, a desktop computer, a laptop computer, a tablet or a smartphone, etc.

In a particularly advantageous manner, in order to connect to the control device 2 and access the functionalities of the spectrometric device 30, the interface module 4 does not need to be equipped with an application for controlling the spectrometer and/or the auxiliary modules. The only need is a web browser on which the operator connects with a personal or institutional account to access the control device 2. Such an interface module 4 equipped with a web browser to connect to the control device 2 is also called a "thin client", because no application for controlling the spectrometric device 30 is installed on the interface module 4. Once connected with his account, the user or operator can use a control application installed on the control device 2, by viewing the graphic interface of the embedded application.

Of course, the system 1 according to the present invention can comprise a plurality of interface modules 4. A plurality of users or operators are thus able to remotely connect to the control device 2 using their computers, smartphones, tablets or other types of interface module 4. In this case, each of the users can have a personal account on which he hast to connect with a password to access the functionalities of the control device 2.

According to one embodiment, the remote spectrometer control system 1 has, in addition to the remote internet connection between the control device 2 and the interface module 4, a local connection between the interface module 4, which is located close to the control device 2 and spectrometer 3, and the control device 2. This local connection, indicated by reference 15 in FIG. 1, can be implemented, for example, by WLAN or by Ethernet. Thus, a user or operator located close to the installation of the spectrometer 3 and of the control device 2 (for example, in a nearby room) can also connect to the latter with his interface module.

Alternatively, or in addition, the control device may be directly provided with an integrated graphical interface, for example in the form of a touch screen. The operator may then control the spectrometric device from this graphical interface.

Figure 2:
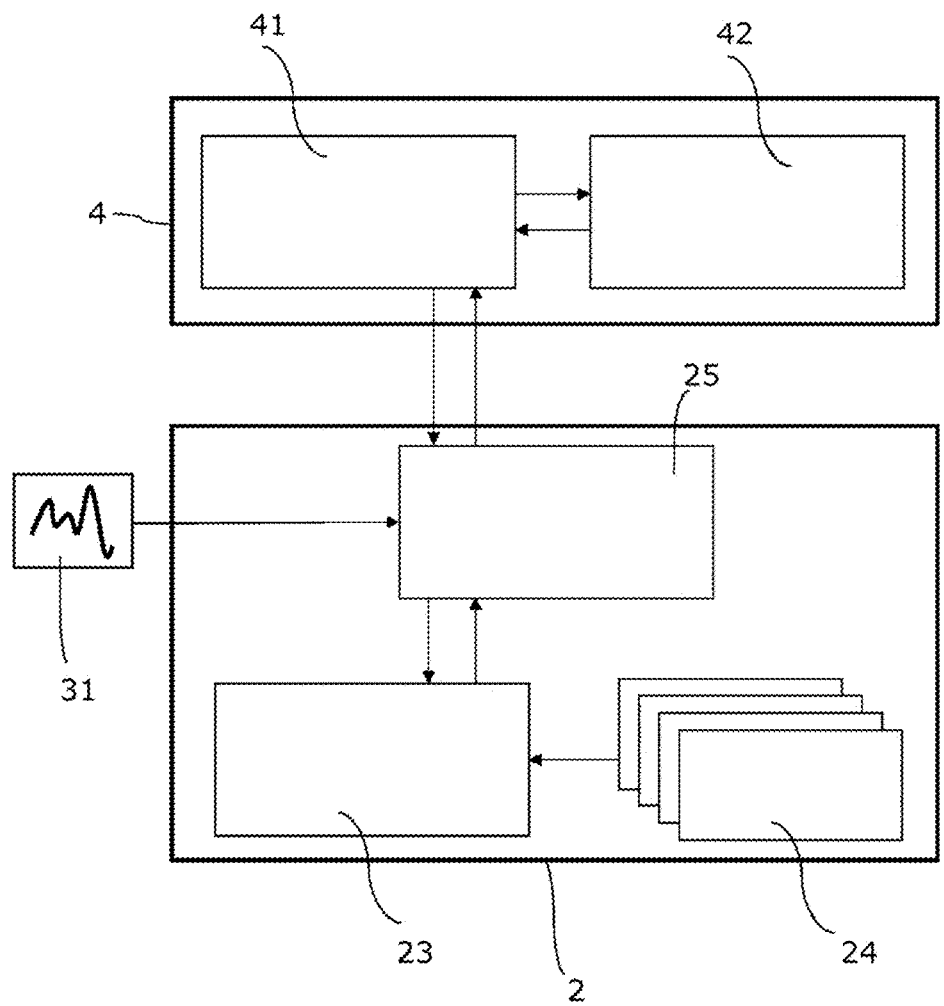
FIG. 2 is a diagram of software bricks of a control device and of an interface module according to one embodiment of the invention.

FIG. 2 shows an example of a block diagram of the software bricks installed on the control device 2 and on the interface module 4, and of their interactions, shown as arrows. As mentioned above, the control device 2, and more precisely its main controller board, includes a database and in particular a library 23 for predicting data and reference models 24, and a control web application 25 for controlling the spectrometric device, processing spectrometric data 31 measured by the spectrometric device and communicating with the interface module. A graphical user interface 41 (GUI) of the web application 25 is present on the interface module 4. A web dashboard 42 is loaded on the interface module 4 when the operator connects to the control device 2 via the web application 41, allowing viewing of the status of sensors, relays or other auxiliary equipment 5a-5d, any error messages as well as spectra obtained during the launch of an analysis by the operator.

The system according to the present invention can be implemented, for example, in a monitoring station of an anaerobic digestion center. This allows to carry out continuous analyses of the quality of the materials circulating between the sub-assemblies of the anaerobic digestion center. In the event of any malfunctions, the remote-control device can generate alerts for remote operators, which allows, for example, to carry out additional remote analysis before sending personnel on site.

Other examples of embodiment include the use of a spectrometric device on production lines, for example, for quality, quantity, process flow, transformation, fermentation, cooking, or the installation of such a system in a waste sorting center.

The system according to the invention may include any type of spectrometer. It may, for example, include a miniature spectrometer and in particular a miniature spectrometer embedded in a system intended for spectrometric analysis, or any other type of mass spectrometer or optical spectrometer delivering measurements of absorption, reflection, transflexion and/or transmission.

Of course, the invention is not limited to the examples which have been described and numerous modifications can be made to these examples without departing from the scope of the invention.

The invention claimed is:

1. A spectrometer remote-control system, comprising:
   at least one spectrometric device comprising a spectrometer and auxiliary modules, the spectrometric device being configured to measure spectrometric data relating to an object and/or a process;

a remote-control device configured to control the spectrometric device, the remote-control device comprising:

spectrometer control means for controlling the spectrometric device equipped with a specific application allowing to control, manage and configure the spectrometer as well as all the auxiliary modules, acquisition means for acquiring and processing the spectrometric data, and communication means for remote-communicating; and at least one interface module configured to communicate with the remote-control device, wherein:

the remote-control device is configured to communicate with the interface module via the Internet, the spectrometric device is interchangeable, and the interface module is interchangeable.

2. The spectrometer remote-control system according to claim 1, wherein the spectrometer control means for controlling the spectrometric device comprise at least:

configuration means for configuring the spectrometric device;

spectrometer driving means for driving the spectrometer; and/or auxiliary driving means for driving the auxiliary modules.

3. The spectrometer remote-control system according to claim 1, wherein the acquisition means for acquiring and processing spectrometric data of the remote-control device include a database comprising models of reference spectra and a prediction library.

4. The spectrometer remote-control system according to claim 1, wherein the interface module comprises at least one of:

a smartphone;

a smartwatch;

a digital tablet;

a laptop; and a desktop computer.

5. The spectrometer remote-control system according to claim 1, wherein the remote-control device is further configured to communicate with the interface module via a wired or wireless local network.

6. The spectrometer remote-control system according to claim 1, wherein the remote-control device further comprises alert generation means for generating alerts, the alert generation means being configured to deliver alert signals to the interface module when the remote-control device has detected anomalies in an operation of the spectrometric device, the object and/or the process measured by the spectrometric device.

7. The spectrometer remote-control system according to claim 1, wherein the spectrometer is a miniature spectrometer.

8. A remote-control device for remote-controlling a spectrometric device, the remote-control device comprising:

spectrometer control means for controlling the spectrometric device;

acquisition means for acquiring and processing spectrometric data; and communication means for remote-communicating, the remote-control device being configured for use in a spectrometer remote-control system according to claim 1.

* * * * *